US011943849B2

(12) United States Patent
Saes et al.

(10) Patent No.: US 11,943,849 B2
(45) Date of Patent: Mar. 26, 2024

(54) LED BASED ILLUMINATION SYSTEM

(71) Applicant: eldoLAB Holding B.V., Son en Breugel (NL)

(72) Inventors: Marc Saes, Son en Breugel (NL); Tijs Versteegde, Eindhoven (NL)

(73) Assignee: eldoLAB Holding B.V., Son en Breugel (NL)

( * ) Notice: Subject to any disclaimer, the term of this patent is extended or adjusted under 35 U.S.C. 154(b) by 37 days.

(21) Appl. No.: 17/629,980

(22) PCT Filed: Jul. 29, 2020

(86) PCT No.: PCT/EP2020/071441

§ 371 (c)(1),
(2) Date: Jan. 25, 2022

(87) PCT Pub. No.: WO2021/018984

PCT Pub. Date: Feb. 4, 2021

(65) Prior Publication Data

US 2022/0256667 A1 Aug. 11, 2022

(30) Foreign Application Priority Data

Jul. 30, 2019 (NL) ..................................... 2023590

(51) Int. Cl.
*H05B 45/30* (2020.01)
*H05B 47/175* (2020.01)

(52) U.S. Cl.
CPC ........... *H05B 45/30* (2020.01); *H05B 47/175* (2020.01)

(58) Field of Classification Search
CPC ...... H05B 45/30; H05B 47/175; H05B 45/14; H05B 45/18
See application file for complete search history.

(56) References Cited

U.S. PATENT DOCUMENTS

2009/0021955 A1 1/2009 Kuang et al.
2010/0214082 A1* 8/2010 Covaro .................... H04B 3/54 370/212
2012/0187845 A1* 7/2012 Saes ....................... H05B 45/28 315/297

FOREIGN PATENT DOCUMENTS

DE 202004006292 U1 7/2004
WO 2011002280 A1 1/2011
WO 2015149096 A1 10/2015

OTHER PUBLICATIONS

Netherlands Search Report and Written Opinion for NL Application No. 2023590, dated Feb. 25, 2020, 16 pages.

(Continued)

*Primary Examiner* — Daniel D Chang
(74) *Attorney, Agent, or Firm* — BUCHANAN, INGERSOLL & ROONEY PC

(57) ABSTRACT

A method of initializing an LED driver to power an LED light engine comprising one or more LEDs is disclosed, the method comprising:

connecting a control terminal of the LED driver to a control terminal of the LED light engine;

determining whether the control terminal of the LED light engine is a communication terminal by outputting a communication signal from the control terminal of the LED driver to the control terminal of the LED light engine;

establishing that the control terminal of the LED light engine is a communication terminal if a reply communication signal to the communication signal is received within a predetermined period;

if the control terminal of the LED light engine is a communication terminal, perform an initialisation of the LED driver by exchanging configuration data between the LED driver and the LED light engine;

(Continued)

if the control terminal of the LED light engine is not a communication terminal, determining an impedance value observed at the control terminal of the LED light engine and performing an initialisation of the LED driver based on the impedance value.

14 Claims, 4 Drawing Sheets

(56) References Cited

OTHER PUBLICATIONS

International Search Report for International Application No. PCT/EP2020/071441 dated Sep. 8, 2020, 5 pages.

* cited by examiner

LED BASED ILLUMINATION SYSTEM

RELATED APPLICATIONS

This application is a U.S. National Phase Patent Application of International Application Number PCT/EP2020/071441, filed 29 Jul. 2020, which claims priority to Netherlands Application No. NL 2023590, filed 30 Jul. 2019, the disclosures of which are incorporated herein by reference in their entirety for all purposes.

FIELD OF THE INVENTION

The present invention relates to LED based illumination systems, in particular to power supplies for such LED based illumination systems.

BACKGROUND OF THE INVENTION

LED based illumination systems are currently widely used for both domestic and professional illumination.

Compared to conventional illumination systems such as incandescent or halogen lamps, LED based illumination systems may have a large variation in functionality which results in a large variation in power or powering requirements. Typically, LED based luminaires are powered using a power converter, also referred to as an LED driver, which converts an available power supply, e.g. a mains power supply, to a convenient power supply for the LED based luminaire or illumination system. Because of the large available variation in LED based luminaires and a corresponding large variation in power requirements, one cannot merely connect an arbitrary LED driver to an arbitrary LED based luminaire. More specifically, one needs to be sure that the power supply as generated by the particular LED driver, e.g. characterised by an output voltage and current, is suitable to drive the particular LED based luminaire. Phrased differently, one needs to ensure that the power supply as generated by the LED drives matches with the power requirements of the LED based luminaire.

In known arrangements, such a matching between an LED driver and a LED based luminaire has to be done manually, whereby the available output power of the LED driver is set so as to match with the requirements of the LED based luminaire. Alternatively, a setting or initialisation of the LED driver's output power may also be realised by the LED driver exchanging information with the LED based luminaire, e.g. via a communication terminal.

Typically, the requirement to match an operation of a particular LED driver to a particular LED based luminaire may require either the LED driver or the luminaire to have multiple input or output terminals.

SUMMARY OF THE INVENTION

It would be desirable to further facilitate an automated matching between an LED driver and a LED based luminaire or LED based light engine.

To better address one or more of these concerns, in an aspect of the invention, there is provided a method of initializing an LED driver to power an LED light engine comprising one or more LEDs, the method comprising:

- connecting a control terminal of the LED driver to a control terminal of the LED light engine;
- determining whether the control terminal of the LED light engine is a communication terminal by outputting a communication signal from the control terminal of the LED driver to the control terminal of the LED light engine;
- determining that the control terminal of the LED light engine is a communication terminal if a reply communication signal to the communication signal is received within a predetermined period;
- if the control terminal of the LED light engine is a communication terminal, perform an initialisation of the LED driver by exchanging configuration data between the LED driver and the LED light engine;
- if the control terminal of the LED light engine is not a communication terminal, determining an impedance value observed at the control terminal of the LED light engine and performing an initialisation of the LED driver based on the impedance value.

According to a further aspect of the present invention, there is provided an LED driver for powering an LED light engine, the LED driver comprising:

- a control terminal configured to be connected to a control terminal of the LED light engine;
- a control unit connected to the control terminal of the LED driver, the control unit being configured to determine whether the control terminal of the LED light engine is a digital communication terminal or an analogue terminal by:
  - providing a communication signal to the control terminal of the LED light engine, and
  - determining that the control terminal of the LED light engine is a communication terminal if a reply communication signal to the communication signal is received within a predetermined period;
- wherein the control unit is further configured to:
  - if the control terminal of the LED light engine is a communication terminal, perform an initialisation of the LED driver by exchanging configuration data between the LED driver and the LED light engine;
  - if the control terminal of the LED light engine is not a communication terminal, determining an impedance value observed at the control terminal of the LED light engine and performing an initialisation of the LED driver based on the impedance value.

According to yet a further aspect of the present invention, there is provided an LED light engine comprising

- one or more LEDs,
- a power supply terminal configured to receive a supply power for powering the one or more LEDs,
- and a control terminal;
- wherein the LED light engine further comprising a temperature sensing element, and wherein the LED light engine comprises a circuit configured to connect the temperature sensing element to the control terminal when a supply voltage for the LED light engine is provided to the power supply terminal and to disconnect the temperature sensing element from the control terminal when no supply voltage for the LED light engine is provided to the power supply terminal.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1A:
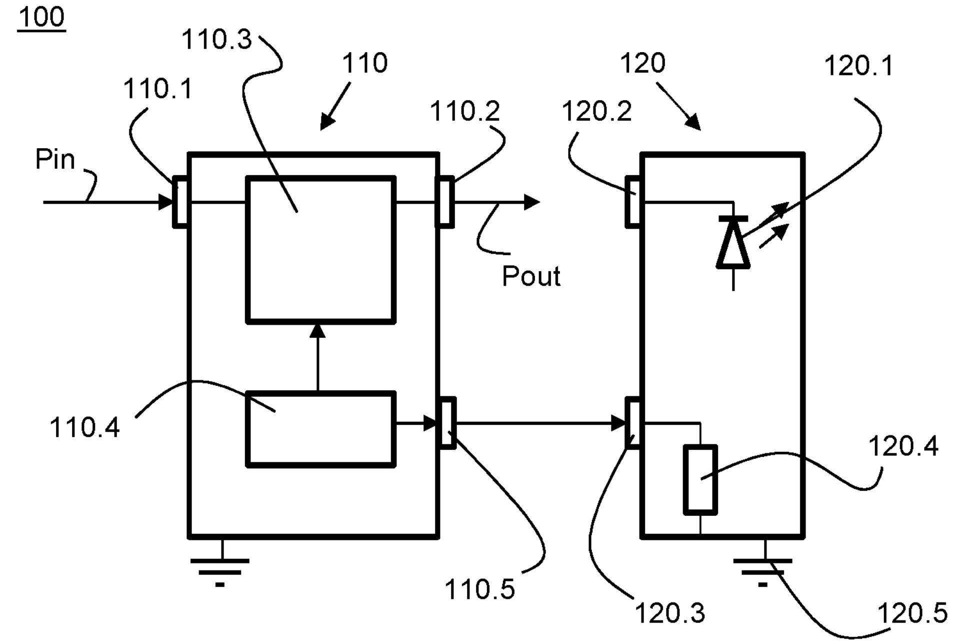
FIG. 1*a* depicts a first embodiment of a lighting system according to the present invention.

FIG. 1*a* schematically shows a lighting system 100 according to the present invention, the lighting system 100 comprising an LED driver 110 according to the present invention and an LED light engine 120 according to the present invention.

In the embodiment as shown, the LED driver 110 comprises an input terminal 110.1 for receiving a supply power Pin, and an output terminal 110.2 for outputting a required power Pout for powering the light engine 120. Pin can e.g. be provided via a rectified mains supply power or a DC power source. The output power Pout can e.g. be a DC current or a pulsed DC current for powering the LED or LEDs 120.1 of the LED light engine 120. The output power Pout as generated by the LED driver 110 can e.g. be provided to the light engine 120 via the input terminal 120.2 of the LED light engine 120. In the embodiment as shown, the LED driver 110 comprises a power converter 110.3 that is configured to convert the supply power as received via the input terminal 110.1 to the required output power Pout for powering the light engine 120. The power converter 110.3 can e.g. be a switched mode power converter such as a Buck, Boost or hysteretic converter. The power converter 110.3 can e.g. be configured to supply a suitable current to the light engine 120 for powering the LED or LEDs 120.1. The supplied current may return to the power converter either via a ground terminal, in which case the LED or LEDs 120.1 are connected between the input terminal 120.2 and the ground terminal 120.5, or via a dedicated return terminal (not shown). In the embodiment as shown, the power converter 110.3 can be controlled by a control unit or controller 110.4, e.g. comprising a processor or microcontroller. In accordance with the present invention, the LED driver 110 further comprises a control terminal 110.5 which can be applied by the control unit or controller 110.4 for retrieving information of the light engine 120 and/or for communicating with the light engine 120. In this respect, the control terminal 110.5 may also be referred to as a communication terminal. In the embodiment as shown, the LED light engine 120 further comprises a control terminal 120.3 which is configured to be connected to the control terminal 110.5 of the LED driver 110. In accordance with an embodiment of the present invention, the LED driver may be configured to perform an initialization method when the control terminal 110.5 of the LED driver 110 is connected to the control terminal 120.3 of the LED light engine 120.

Unlike incandescent conventional lighting applications, light engines comprising LEDs or LED groups may come with a large variety of power requirements. As such, depending on the type of light engine used, the LED driver powering the light engine needs to provide the required power in the appropriate manner for the particular light engine. In particular, the output voltage of the output terminal may e.g. depend on the number of LEDs of the light engine arranged in series. The current requirements may e.g. depend on the number of LEDs that are applied in parallel.

In general, an LED driver may be designed to supply a power within a certain range, e.g. specified as an available voltage range for the output voltage and an available current range for the output current, i.e. the current that can be supplied to the light engine.

In order to ensure that an LED driver provides a suitable power (e.g. both voltage and current matching the light engine requirement) for the light engine, an initialisation of the LED driver is typically performed.

One possible manner to initialize and LED driver is to manually control the possible output of the LED driver, e.g. setting a maximum output voltage and a maximum output current, thus ensuring that the light engine is not damages.

It has also been proposed to initialise a light engine by providing it with a resistor having a predetermined value, whereby, when an LED driver is connected to the light engine, the LED driver can readout the resistance value, and based on the determined value, initialize an operation of the LED driver, thereby ensuring providing the appropriate power to the light engine. Such a resistor may e.g. be referred to as an R-init resistor, as it enables a setting or initialisation of a desired or required output power for the LED driver.

Alternatively, a light engine can be provided with a tag or even with a processor or processing unit whereby information about the light engine can be exchanged via the tag or processor with the control unit of the LED driver. Within the meaning of the present invention, a tag refers to a device which can store data, e.g. in a memory of the tag. The tag is further configured such that the data as stored may be retrieved via a terminal of the tag, e.g. by means of digital communication.

The initialisation data or configuration data that may be derived from an R-init value or which may be retrieved from a tag may e.g. include values for a nominal current, a maximum current, maximum or nominal output voltage or maximum or nominal power. In addition, the initialisation data or configuration data may also provide details on how the particular light engine should be powered. In particular, the initialisation data or configuration data may include information on the modulation method that is to be applied to control the light engine.

Figure 2:
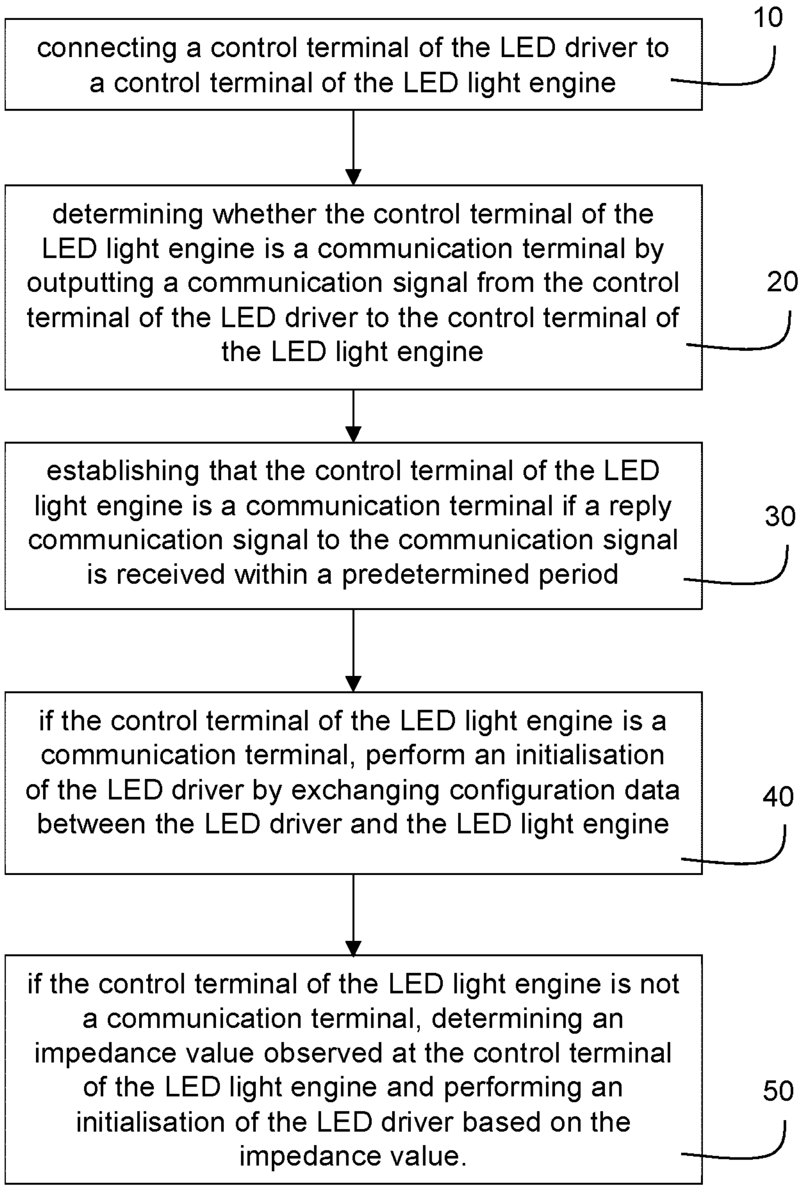
FIG. 2 depicts a flow chart of an embodiment of an initialization method according to the present invention.

According to an aspect of the present invention, a method has been devised enabling an LED driver to initialize irrespective of whether the light engine has been provided with a resistor to set the power requirements or with a tag or processor. The method is schematically depicted in FIG. 2. FIG. 2 schematically shows a method of initializing an LED driver according to an embodiment of the present invention, the method comprises:

- connecting a control terminal of the LED driver to a control terminal of the LED light engine, 10;
- determining whether the control terminal of the LED light engine is a communication terminal by outputting a communication signal from the control terminal of the LED driver to the control terminal of the LED light engine, 20;
- establishing that the control terminal of the LED light engine is a communication terminal if a reply communication signal to the communication signal is received within a predetermined period, 30;
- if the control terminal of the LED light engine is a communication terminal, perform an initialisation of the LED driver by exchanging configuration data between the LED driver and the LED light engine, 40;
- if the control terminal of the LED light engine is not a communication terminal, determining an impedance value observed at the control terminal of the LED light engine and performing an initialisation of the LED driver based on the impedance value, 50.

The method according to present invention may be described with reference to FIGS. 1*a* and 2 as follows:

In a first step 10 of the initialization method according to the present invention, a control terminal 110.5 of the LED driver 110 is connected to a control terminal 120.3 of the LED light engine 120.

In a second step 20, the method comprises determining whether or not the control terminal 120.3 of the LED light engine 120 is a communication terminal or not. This can be realised by transmitting or outputting a communication signal from the control terminal 110.5 of the LED driver 110 to the control terminal 120.3 of the LED light engine 120.

In a third step 30, the method comprises establishing that the control terminal 120.3 of the LED light engine 120 is a communication terminal if a reply communication signal to the communication signal is received within a predetermined period. By doing so, the control terminal 110.5 of the LED driver can establish that the LED light engine 120 that is to be powered is equipped with a tag or processor which has the ability to communicate with the LED driver 110. In case the control terminal 120.3 of the LED light engine is identified as a communication terminal, the method comprises:

a fourth step 40 of perform an initialisation of the LED driver 110 by exchanging configuration data between the LED driver 110 and the LED light engine 120. In this step, the control unit 110.4 of the LED driver 110 may e.g. be configured to retrieve, via the control terminal 110.5, information regarding the required power settings for powering the LED light engine with which it communicates. Such power settings may e.g. include a maximum output voltage, a maximum output current, a nominal current value, etc.

As will be appreciated by the skilled person, various lighting communication protocols may be applied to communicate between the LED driver 110 and the LED light engine 120. Such protocols e.g. include 0-10V, Dali, DMX, or any dedicated communication protocol agreed between the LED driver manufacturer and the LED light engine manufacturer.

In case the control terminal 120.3 of the LED light engine is identified as not being a communication terminal, the method comprises the step 50 of determining an impedance value observed at the control terminal 120.3 of the LED light engine and performing an initialisation of the LED driver based on the impedance value.

In the embodiment shown in FIG. 1*a*, the LED based light engine or LED light engine 120 comprises an impedance 120.4 that is connected to the control terminal 120.3. When the LED driver 110 has established that the control terminal 120.3 is not a communication terminal, when no reply to the communication signal is received within the predetermined period, the control unit 110.4 can assess the impedance value, e.g. a resistance value, of the impedance 120.4. Such an assessment can e.g. include supplying a current to the control terminal 120.3 of the LED light engine 120 and measuring the voltage at the communication terminal 120.3. Alternatively, the control terminal 110.5 may provide a voltage to the control terminal 120.3 and determine the impedance 120.4 based on a current measurement of a current to the control terminal 120.3. In yet another embodiment, use can be made of a voltage supply available in the LED driver, whereby said voltage supply is connected to the control terminal 120.3 of the light engine through a resistor of the LED driver, thus obtaining a voltage divider. Such an embodiment is schematically illustrated in FIG. 1*b*.

Figure 1B:
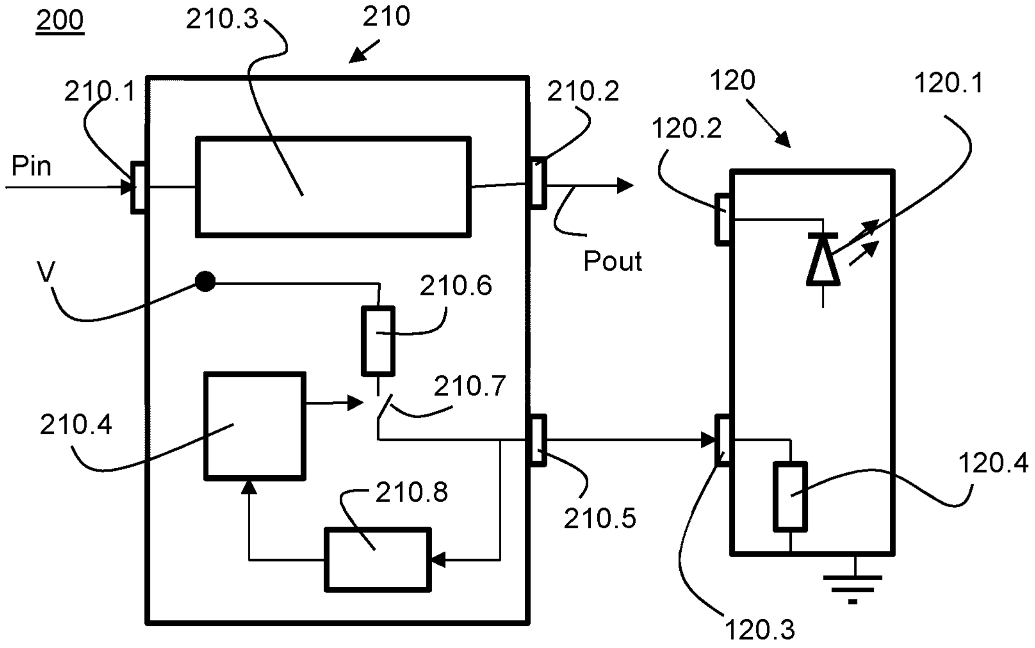
FIG. 1*b* depicts a second embodiment of a lighting system according to the present invention.

FIG. 1*b* schematically shows a lighting system 200 according to the present invention, the lighting system 200 comprising an LED driver 210 according to the present invention and an LED light engine 120 according to the present invention.

In the embodiment as shown, the LED driver 210 comprises an input terminal 210.1 for receiving a supply power Pin, and an output terminal 210.2 for outputting a required power Pout for powering the light engine 120. Pin can e.g. be provided via a rectified mains supply power or a DC power source. The output power Pout can e.g. be a DC current or a pulsed DC current for powering the LED or LEDs 120.1 of the LED light engine 120. The output power Pout as generated by the LED driver 210 can e.g. be provided to the light engine 120 via the input terminal 120.2 of the LED light engine 120. In the embodiment as shown, the LED driver 210 comprises a power converter 210.3 that is configured to convert the supply power as received via the input terminal 210.1 to the required output power Pout for powering the light engine 120. The power converter 210.3 can e.g. be a switched mode power converter such as a Buck, Boost or hysteretic converter. The power converter 210.3 can e.g. be configured to supply a suitable current to the light engine 120 for powering the LED or LEDs 120.1. The supplied current may return to the power converter either via a ground terminal, in which case the LED or LEDs 120.1 are connected between the input terminal 120.2 and the ground terminal 120.5, or via a dedicated return terminal (not shown). In the embodiment as shown, the power converter 110.3 can be controlled by a control unit or controller 110.4, e.g. comprising a processor or microcontroller. In accordance with the present invention, the LED driver 210 further comprises a control terminal 210.5 which can be applied by the control unit or controller 210.4 for retrieving information of the light engine 120 and/or for communicating with the light engine 120. In an embodiment of the present invention, the control terminals as applied, e.g. control terminals 210.5 and 120.3 or terminal 110.5 may be single wire terminals or single terminals. In such case, the LED driver and the LED based light engine may have a common ground or ground terminal. In the embodiment as shown, LED driver 210 further comprises a circuit for determining a value of a resistance, e.g. an R-init resistance that is connected to the control terminal 210.5. In particular, the LED driver as shown comprises a resistor 210.6 that is connected to a supply voltage V of the LED driver and which voltage V can be connected, through resistor 210.6 to the control terminal 210.5 of the LED driver 210. In order to provide this connection, the control unit or controller 210.4 of the LED driver 210 may be configured to control the operation of a switch 210.7. When switch 210.7 is closed, the resistor 210.7 and the R-init resistor of the light engine 120 form a voltage divider. Switch 210.7 may e.g. be a MOSFET or the like. As such, when the supply voltage V and the resistor 210.6 are known, the value of the resistor R-init can be determined, based on the voltage at the control terminal 210.5. In the embodiment as shown, said voltage is provided to the control unit 210.4 via and A/D converter 210.8. Based on the received signal from the A/D converter 210.8, the control unit 210.4 may determine the value of the R-init resistor of the light engine and determine, e.g. by accessing a database, any configuration data for the LED driver, in order to power the particular light engine 120 in a suitable manner.

In the embodiment as shown in FIGS. 1*a* and 1*b*, component 120.4 is referred to as an impedance, e.g. a resistor, which value can be determined by the LED driver 110 or 210 and which value can be used in an initialisation of the LED driver 110 or 210. It can be pointed out that the impedance 120.4 need not be a single component but may be a combination of components. By doing so, the information that can be deduced from a value of the impedance which is measured or determined by the LED driver can be increased. This increased or additional information may e.g. be applied to further configure or initialise the LED driver, so as to better drive the LED light engine.

As an example, the impedance can e.g. be a resistor with a parallel capacitor. By suitable application of a current to the terminal 120.3 and monitoring the voltage at the terminal, or applying a voltage to the terminal 120.3 and monitoring the current to the terminal, one can assess both the values of the resistor and the capacitor. In this particular example, the values can e.g. be determined based on a time constant at which the generated voltage or current changes. In particular the rise or fall timing can be used to determine the time constant of the RC (resistor-capacitor) circuit that is applied as impedance. Known measurement methods for determining an impedance value or values can be applied. In such embodiment, the resistor value can e.g. be used to set a nominal current to be supplied to the light engine, whereas the capacitor value may e.g. be applied to define a nominal color set point to be generated or another parameter associated with the operation of the LED driver. As will be appreciated, other examples of impedances having multiple components can be considered as well, e.g. including more complex arrays or resistors or capacitors or other components such as Zener diodes.

Based on the impedance value, the LED driver 110 or 210 may thus be configured or initialized for powering the LED light engine 120. Such a configuration or initialization may e.g. involve comparing the determined impedance value with a list of impedance values in a database, e.g. a lookup table. For the example of the resistor and capacitor, the LED driver can e.g. be provided with a lookup table have a list of possible resistor and capacitor values and the associated operating parameters. Such a lookup table may e.g. comprise, for each of the possible impedance values, the required power settings for powering the LED light engine. Such power settings may e.g. include a maximum output voltage, a maximum output current, a nominal current value, a color set point, etc. Such a database may be readily available in the LED driver, e.g. in a memory unit of the control unit 110.4. Alternatively, the LED driver 110 or 210 may be configured to access an external database via any suitable means of communications. In such embodiment, the determined impedance value can be used as an identifier for selecting one or more operating parameters for the LED driver. By doing so, a more detailed set of operating parameters can be selected. This can be illustrated as follows: the detection of an impedance value or values can be considered an analog detection. In order for this detection or determination to be reliable, the amount of values that can be chosen may be rather limited, e.g. in a range between 5 and 10 or 15. In case of a one to one correspondence between a determined impedance value and an operating parameter, the selection of values for the operating parameter (e.g. an nominal current) would be limited as well. Alternatively, the impedance value or values as determined can be used as identifiers which can be associated with sets of operating parameters that are e.g. stored in a remote database or in a memory unit of the LED driver. In such case, a particular resistance value may e.g. be associated with a particular set of operating parameters, e.g. including a nominal current, a maximum current, a nominal color set point, a control range for the color set point, a path in a color space to be followed, etc. Such a set of parameters may e.g. be referred to as an illumination profile. In such case, the database or the LED driver memory unit can e.g. comprise n different illumination profiles that can be used by the LED driver, whereby an impedance value, e.g. a resistance value or an capacitor value, or a combination of both values, is used to select the appropriate illumination profile.

In an embodiment of the present invention, the LED light engine may be configured in such manner that the initialization method according to the present invention can be performed using only a single connection between the LED driver and the LED light engine. In such embodiment, the initialization method is thus performed by connecting a single control terminal of the LED driver to a single control terminal of the LED light engine.

In such embodiment, the LED light engine may still include a tag or even a processor or processing unit. In accordance with an embodiment of the present invention, such a tag or processor can then be powered or supplied with a supply voltage via the single connection.

Figure 3:
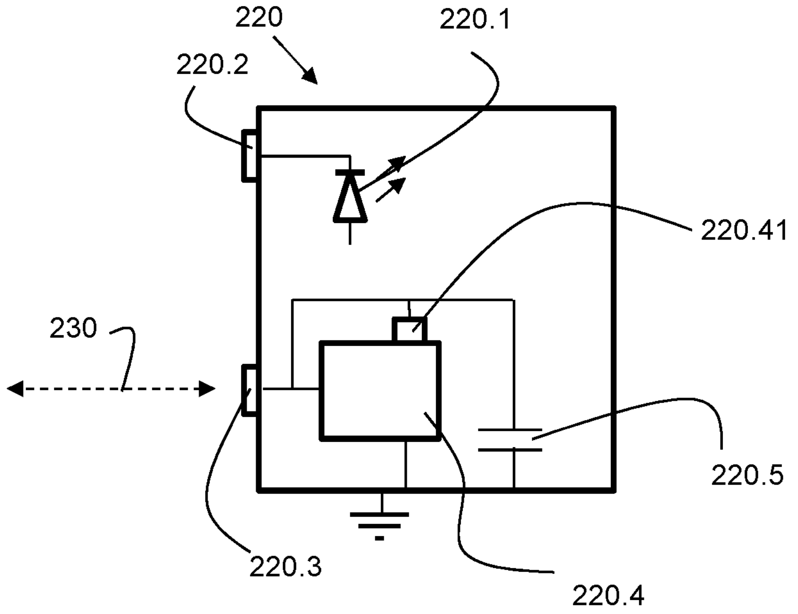
FIGS. 3-6 depicts embodiments of LED based light engines according to the present invention.

FIG. 3 schematically shows such an embodiment of an LED light engine 220 according to the present invention.

In the embodiment as shown, the LED light engine 220 comprises one or more LEDs 220.1 which can e.g. be powered via a power input terminal 220.2. In the embodiment as shown, the LED light engine 220 further comprises a control terminal 220.3 which can be used for communicating with an LED driver, e.g. for exchanging information 230 during an initialization process of the LED driver. The control terminal 220.3 is connected to a processing or control unit 220.4 of the LED light engine, said processing or control unit 220.4 being configured to communicate, via the communication terminal 220.3 with an LED driver to which it can be connected. The processing or control unit 220.4 comprises a power-supply pin or terminal 220.41. In the embodiment as shown, the LED light engine further comprises an energy storage element 220.5, e.g. a capacitance or capacitor, which can be charged via the control terminal 220.3 and which is connected to the power-supply pin or terminal 220.41 of the processing or control unit 220.4.

In the embodiment as shown, the processing or control unit 220.4 may thus be powered by the energy storage element 220.5, the energy storage element 220.5 being chargeable via the control terminal 220.3. In order to apply the above described initialisation method to an LED light engine 220 as shown in FIG. 3, the initialisation method may e.g. comprises the step of outputting, prior to the outputting of a communication signal as provided in step 20 of the initialisation method, a power supply signal from the control terminal of the LED driver, e.g. terminal 110.5, to the control terminal of the LED based light engine, e.g. control terminal 220.3. The outputting of a power supply signal may e.g. comprise providing a sufficiently high DC voltage at the control terminal of the LED driver, in order to charge the energy storage element 220.5. It can be noted that the power supply signal used to charge the energy storage element 220.5 can also be considered to be part of the communication signal. By doing so, the voltage at the power-supply pin or terminal 220.41 can be raised up to a level at which the processing or control unit 220.4 may start operating, e.g. start communicating with the LED driver.

By enabling the LED light engine to be powered via the control terminal, there is no longer a need to connect the LED driver and the LED light engine via two connections; a single connection is thus sufficient.

In addition to being provided with a tag or control unit or R-init resistor or impedance, LED based lighting applications such as LED light engines may also be equipped with temperature sensors. Such sensor or sensors may e.g. be used to assess the operating temperature of the LED or LEDs of the LED light engine. Knowledge of the operating temperature may e.g. be used to adjust or control the current to the LED or LEDs, in order to ensure a desired or required lifetime of the LED or LEDs.

According to an aspect of the present invention, there is provided an LED based light engine or LED light engine that further includes a temperature sensor, e.g. a temperature dependent resistor such as an NTC (negative temperature coefficient) resistor. Such an LED light engine may e.g. be combined with an LED driver according to the present invention, to form a lighting system according to the present invention. A temperature sensor such as an NTC may be applied in an LED based light engine according to the present invention to determine or monitor a temperature of the LED based light engine. By doing so, one can ensure that the LED based light engine is not operated above a maximum temperature. Based on the temperature as sensed, the LED driver may, when needed, adjust the power supplied to the LED based light engine, in order to keep the LED based light engine in a safe operating area. In an embodiment, a temperature sensor such as an NTC may be used in an LED based light engine according to the present invention to determine a die temperature of one or more LEDs of the LED based light engine. Knowledge of the die temperature of an LED may be used by the LED driver to determine the amount of light or light intensity emitted or generated by the LED, as the generated amount of light depends both on the temperature of the die and the current through the LED. An accurate knowledge of the amount of light as generated, obtained by means of the die temperature measurement, enable a more accurate generation of a desired colour by the LED based light engine; a desired colour is typically generated by a combination or mixing the generated light of a plurality of LEDs having a different colour. As such, the more accurate the actual amount of light as generated by such plurality of LEDs is known, the more accurate a desired or required combination or mixing of generated light can be obtained.

In an embodiment of the present invention, the temperature sensor (or sensors) is arranged in such manner in the LED light engine that no additional or separate terminal is required to assess or read-out the temperature sensor.

Various options exist to realise such an arrangement.

Figure 4:
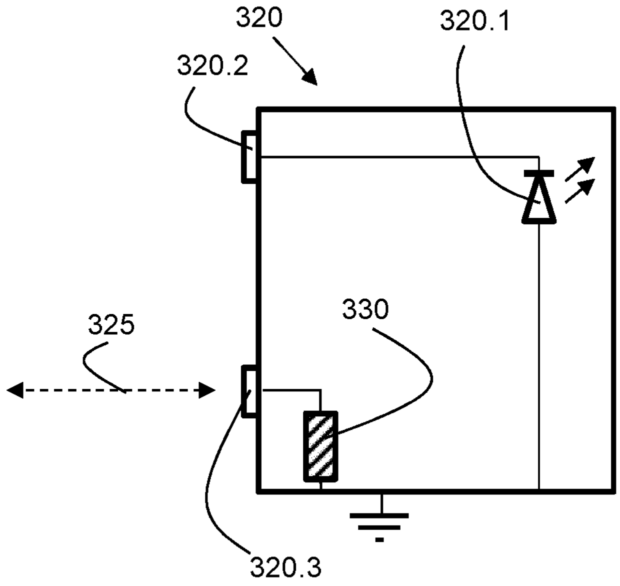

A first example of an LED light engine according to the present invention that includes a temperature sensor is schematically shown in FIG. 4.

FIG. 4 schematically shows an LED light engine 320 that comprises one or more LEDs 320.1 which can e.g. be powered via a power input terminal 320.2. In the embodiment as shown, the LED light engine 320 further comprises a control terminal 320.3 which can be used for communicating with an LED driver. In the embodiment as shown, the LED light engine 320 comprises a temperature sensor 330 that is connected to the control terminal 320.3. In the embodiment as shown, the temperature sensor 330 is assumed to be a temperature dependent resistor, i.e. a resistor of which the resistance value changes. As such, assuming a temperature operating range from T1 to T2, (e.g. from −10° C. to 90° C.), the resistance value of the temperature sensor 330 will vary from a value R1 to R2.

In the embodiment as shown, the LED light engine does not comprise an R-init resistor or impedance, nor does it include a processing or control unit such as control unit 220.4 as shown in FIG. 3. Nevertheless, the LED light engine 320 as schematically shown may still be applied in an initialisation method according to the present invention.

As illustrated in FIG. 2, the initialisation method according to the present invention comprises the step 50 of initialising an LED driver based on a detected impedance value.

As described above, such a configuration or initialization may e.g. involve comparing the determined impedance value with a list of impedance values in a database, e.g. a lookup table.

Such a database may e.g. comprise, for each of the possible impedance values, the required power settings for powering the LED light engine.

When the resistance value of the temperature sensor 330 is selected in such manner that it does not correspond to any value available in the impedance value database, the initialisation method may involve initialising the LED driver according to its nominal setting or operating conditions.

As such, an embodiment of the initialisation method according to the present invention may involve the following steps:

In case it is determined that the control terminal of the LED light engine is not a communication terminal, the LED driver may:

- determine an impedance value observed at the control terminal and
- perform an initialisation of the LED driver based on the impedance value by:
  - comparing the impedance value with a set or range of impedance values in a database, and
  - if the impedance value does not correspond to a value of the set of impedance values or is outside the range of impedance values, initialise the LED driver according to its nominal settings.

In order to determine the resistance value of the temperature sensor 330, similar methods as described above with respect to the determination of the R-init value may be applied. In particular, the LED driver (not shown) that needs to be initialised may apply a suitable signal (a voltage or current) 325 to the control terminal 320.3, in order to determine the resistance value.

By applying the above, in accordance with an embodiment of the present invention, an LED driver may be configured, based on a senses impedance value of a temperature sensor, e.g. a temperature resistor. As will be appreciated by the skilled person, the temperature dependency of the temperature resistor may need to be taken into account to assess whether or not the sensed impedance is an R-init resistor or a temperature dependent resistor such as an NTC. With reference to the above given example, the resistance range or characteristic of the temperature sensor 330, i.e. the resistance range from R1 to R2, should be selected in such manner that it does not overlap with resistance values present in the database of R-init values that is applied or accessed by the LED driver.

Figure 5:
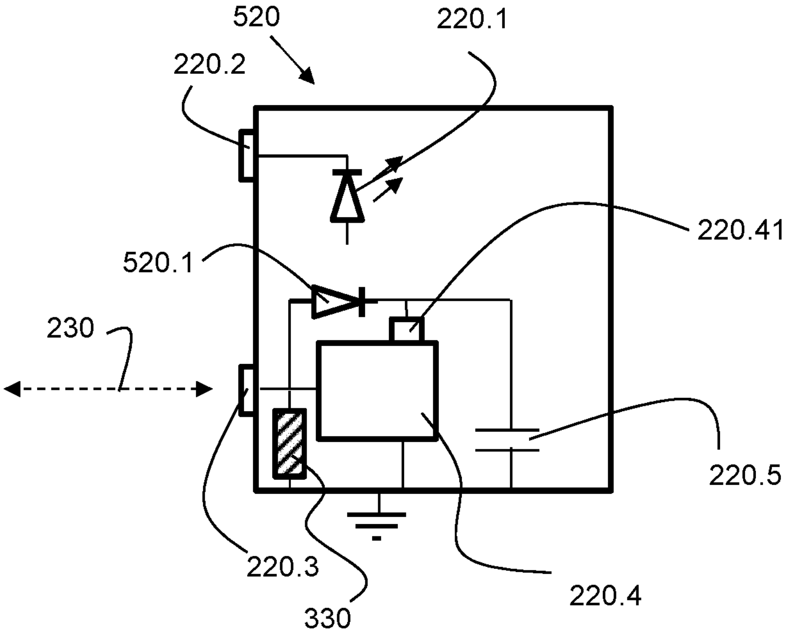

In an alternative embodiment, illustrated in FIG. 5, the LED based light engine according to the present invention comprises both a tag or processing unit and a temperature sensor. Such embodiment can e.g. be considered a combination of the embodiments of FIGS. 3 and 4. In the embodiment as shown, the LED based light engine 320 comprises one or more LEDs 220.1 which can e.g. be powered via a power input terminal 220.2. In the embodiment as shown, the LED light engine 320 further comprises a control terminal 220.3 which can be used for communicating with an LED driver, e.g. for exchanging information 230 during an initialization process of the LED driver. The control terminal 220.3 is connected to a processing or control unit 220.4 of the LED light engine, said processing or control unit 220.4 being configured to communicate, via the control terminal 220.3 with an LED driver to which it can be connected. The processing or control unit 220.4 comprises a power-supply pin or terminal 220.41. In the embodiment as shown, the LED light engine further comprises an energy storage element 220.5, e.g. a capacitance or capacitor, which can be charged via the control terminal 220.3 and which is connected to the power-supply pin or terminal 220.41 of the processing or control unit 220.4.

In the embodiment as shown, the processing or control unit 220.4 may thus be powered by the energy storage element 220.5 as described above, with reference to FIG. 3.

In the embodiment as shown, the LED light engine 320 further comprises a temperature sensor 330, which can e.g. be similar or the same as the temperature sensor 330 of FIG. 4. The temperature sensor 330 may e.g. be a temperature dependent resistor, i.e. a resistor of which the resistance value changes. As such, assuming a temperature operating range from T1 to T2, (e.g. from −10° C. to 90° C.), the resistance value of the temperature sensor 330 will vary from a value R1 to R2. In the embodiment as shown, the temperature sensor 330 is connected to the control terminal 220.3 of the LED light engine 320 and can be read-out in a similar manner as discussed with reference to FIG. 4.

In the embodiment as shown, the LED light engine further comprises a diode 320.1 that is configured to ensure that the energy storage element 220.5, e.g. a capacitance, is not discharged or depleted via the temperature sensor 330.

Figure 6:
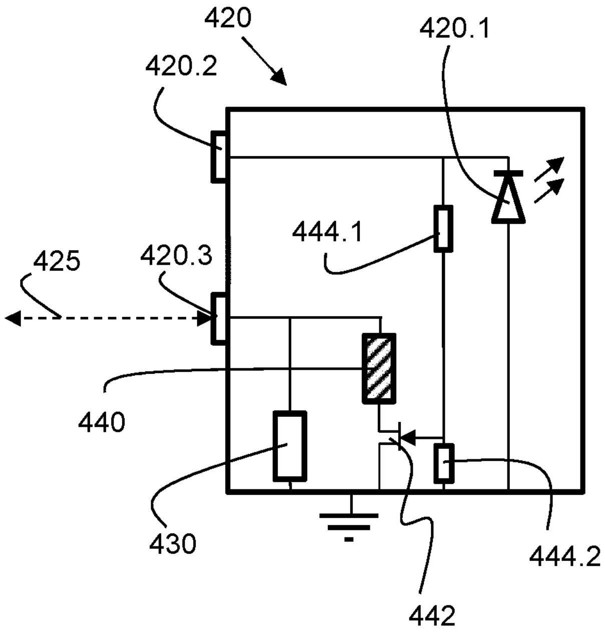

In FIG. 6, yet another embodiment of a LED light engine according to the present invention is schematically shown. FIG. 6 schematically shows an LED light engine 420 that comprises one or more LEDs 420.1 which can e.g. be powered via a power input terminal 420.2. In the embodiment as shown, the LED light engine 420 further comprises a control terminal 420.3 which can be used for communicating with an LED driver (not shown), as indicated by the arrow 425. In the embodiment as shown, the LED light engine 420 comprises an R-init resistor 430 connected to a control terminal 420.3, in a similar manner as in the LED light engine 120 as described above.

In the embodiment as shown, the LED light engine 420 further comprises a temperature dependent resistor 440 which is connectable in parallel to the R-init resistor 430. In the embodiment as shown, the LED light engine 420 comprises a circuit 442, 444.1, 444.2, that is configured to connect the temperature sensing element 440 in parallel to the R-init resistor 430. In the embodiment as shown, the circuit 442, 444.1, 44.2 comprises a switch 442 and a resistor pair 444.1, 444.2 forming a voltage divider, the circuit being configured to connect the temperature dependent resistor 420 in parallel to the R-init resistor 430, when a supply voltage for the LED light engine 420 is provided to the supply terminal 420.2. In particular, the resistor divider 444.1, 444.2 and switch 442 are configured to close the switch 442 when a supply voltage is present at terminal 420.2, thereby connecting the temperature sensing element 440, e.g. an NTC, in parallel to the R-init resistor 430. In case no supply voltage is present at the terminal 420.2, switch 442 will be in an open state. In such state, the temperature sensing element 440 cannot be detected or observed at the control terminal 420.3. By doing so, the circuit 442, 444.1, 444.2 ensures that, during an initialisation, only the R-init resistor 430 is observed or detected at the control terminal 420.3. As such, the aforementioned initialisation process may be performed, whereby an LED driver that is connected to the control terminal 420.3 may be initialised based on a sensed or determined value of the R-init resistor 430. Once the initialisation process of the LED driver is performed, the LED driver's power output terminal may be connected to the power input terminal 420.2 of the LED based light engine 420. As a result, from then on, the impedance as measured at the control terminal 430 also includes the impedance of the temperature sensing element 440, e.g. an NTC resistor. As such, during normal operation, the sensed impedance can then be used to assess the temperature of the LED light engine that is operated. Note that in this case, the same control terminal of the LED light engine has a dual functionality, depending on the operating mode:

- during initialisation, the control terminal 420.3 of the LED light engine 420 can be used to read-out the resistance value of resistor 430, thus enabling the initialisation of the LED driver.
- during normal operation, when both the control terminal 420.3 and the power terminal 420.2 of the LED light engine are connected to an LED driver, the control terminal can be used to read-out the resistance value of the combination of resistor 430 and 440, which resistance value characterises an operating temperature of the LED based light engine 420.

By doing so, there is no additional terminal needed at the LED driver or at the LED based light engine to assess, during normal operation, the temperature of the LED based light engine. The design and manufacturing of both the LED driver and the LED based light engine may thus be simplified, more compact and less expensive.

In the embodiment as shown in FIG. 6, the LED light engine 420 comprises an R-init resistor 430 which can be sensed, during an initialisation process, in order to initialize an LED driver that is connected to the control terminal 420.3. Alternatively, the LED based light engine 420 can be equipped with a tag or processing unit, in a similar manner as e.g. shown in FIG. 3 or FIG. 5.

In a similar manner as described with respect to FIG. 6, such an embodiment may be combined with a temperature resistor and circuit as shown in FIG. 6, thereby enabling the control terminal of the LED light engine to have a dual functionality.

The various embodiments of the LED driver and LED light engine as describe above enable to minimize the number of terminals for the LED driver and LED light engine, while still maintaining the flexibility of initializing the LED driver, i.e. ensuring that the power as supplied by the LED driver matches or suits the LED light engine.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. A method of initializing an LED driver to power an LED light engine comprising one or more LEDs, the method comprising:

connecting a control terminal of the LED driver to a control terminal of the LED light engine;

determining whether the control terminal of the LED light engine is a communication terminal by outputting a communication signal from the control terminal of the LED driver to the control terminal of the LED light engine;

establishing that the control terminal of the LED light engine is a communication terminal if a reply communication signal to the communication signal is received within a predetermined period;

if the control terminal of the LED light engine is a communication terminal, perform an initialization of the LED driver by exchanging configuration data between the LED driver and the LED light engine;

if the control terminal of the LED light engine is not a communication terminal, determining an impedance value observed at the control terminal of the LED light engine and performing an initialization of the LED driver based on the impedance value.

2. The method according to claim 1, wherein the impedance value is a resistance value, a capacitor values or a combination of a resistance value and a capacitor value.

3. The method according to claim 1, wherein the communication signal comprises a digital communication signal.

4. The method according to claim 3, wherein the LED light engine comprises a processing unit or tag and an energy storage element configured to power the processing unit or tag and wherein the communication signal is configured to charge the energy storage element, thereby enabling the LED light engine to provide the reply communication signal.

5. The method according to claim 4, wherein the energy storage element comprises a capacitor.

6. The method according to claim 1, wherein the control terminal of the LED driver is a single terminal and wherein the control terminal of the LED light engine is a single terminal.

7. The method according to claim 1, wherein the method is performed without connecting a supply voltage or power supply to the LED light engine.

8. A method of operating an LED driver, the method comprising:

performing the method according to claim 1; and connecting a power output terminal of the LED driver to a power input terminal of the LED light engine.

9. The method of operating an LED driver according to claim 8, further comprising:

determining an impedance value observed at the control terminal of the LED light engine;

determining a temperature of the LED light engine based on the determined impedance value and controlling a power supply to the LED light engine based on the determined temperature.

10. An LED driver for powering an LED light engine, the LED driver comprising:

a control terminal configured to be connected to a control terminal of the LED light engine;

a control unit connected to the control terminal of the LED driver, the control unit being configured to determine whether the control terminal of the LED light engine is a digital communication terminal or an analogue terminal by:

providing a communication signal to the control terminal of the LED light engine, and establishing that the control terminal of the LED light engine is a communication terminal if a reply communication signal to the communication signal is received within a predetermined period;

wherein the control unit is further configured to:

if the control terminal of the LED light engine is a communication terminal, perform an initialization of the LED driver by exchanging configuration data between the LED driver and the LED light engine;

if the control terminal of the LED light engine is not a communication terminal, determining an impedance value observed at the control terminal of the LED light engine and performing an initialization of the LED driver based on the impedance value.

11. The LED driver according to claim 10, wherein the LED driver is configured to supply a current to the control terminal of the LED light engine via the control terminal of the LED driver.

12. The LED driver according to claim 11, wherein the impedance value is determined based on a voltage observed at the control terminal of the LED light engine, when the current is supplied to the LED light engine.

13. The LED driver according to claim 10, further comprising a power converter configured to power the LED light engine, the power converter comprising a power supply terminal configured to be connected to a power supply terminal of the LED light engine for supplying a power to the LED light engine.

14. The LED driver according to claim 13, wherein the control unit is configured to, when the power supply terminal of the power converter is connected to the power supply terminal of the LED light engine:

determine an impedance value observed at the control terminal of the LED light engine;

determine a temperature of the LED light engine based on the determined impedance value and control a power supply to the LED light engine based on the determined temperature.

* * * * *